(12) United States Patent
Walter et al.

(10) Patent No.: US 9,878,854 B2
(45) Date of Patent: Jan. 30, 2018

(54) SORTING OF PACKAGES

(71) Applicants: DEUTSCHE POST AG, Bonn (DE); TRANSNORM SYSTEM GMBH, Harsum (DE)

(72) Inventors: Detlef Walter, Langenhagen (DE); Sidy Diop, Hildesheim (DE); Arnd Kraemer, Hildesheim (DE); Kai Ventz, Hildesheim (DE); Karl Warnecke, Sibbesse (DE); Stefan Huke, Sehnde (DE); Tillmann Eid, Hannover (DE); Bernd Hartmann, Grafschaft-Leimersdorf (DE)

(73) Assignees: DEUTSCHE POST AG (DE); TRANSNORM SYSTEM GmbH (DE)

( * ) Notice: Subject to any disclaimer, the term of this patent is extended or adjusted under 35 U.S.C. 154(b) by 0 days.

(21) Appl. No.: 14/782,794

(22) PCT Filed: Apr. 15, 2014

(86) PCT No.: PCT/EP2014/057565
§ 371 (c)(1),
(2) Date: Oct. 7, 2015

(87) PCT Pub. No.: WO2014/170294
PCT Pub. Date: Oct. 23, 2014

(65) Prior Publication Data
US 2016/0311630 A1    Oct. 27, 2016

(30) Foreign Application Priority Data

Apr. 16, 2013 (DE) .......................... 10 2013 206 790

(51) Int. Cl.
*B65G 47/31* (2006.01)
*B65G 15/10* (2006.01)
*B65G 47/68* (2006.01)

(52) U.S. Cl.
CPC .......... *B65G 47/31* (2013.01); *B65G 15/105* (2013.01); *B65G 47/682* (2013.01)

(58) Field of Classification Search
CPC ........ B65G 47/53; B65G 47/54; B65G 47/30; B65G 47/32; B65G 15/10; B65G 15/12; B65G 15/105
See application file for complete search history.

(56) References Cited

U.S. PATENT DOCUMENTS

| 2001/0030102 A1 | 10/2001 | Woltjer et al. |
| 2003/0209408 A1 | 11/2003 | Carey et al. |

(Continued)

FOREIGN PATENT DOCUMENTS

| CN | 101027236 A | 8/2007 |
| CN | 202138848 U | 2/2012 |

(Continued)

*Primary Examiner* — Mark A Deuble
(74) *Attorney, Agent, or Firm* — Tarolli, Sundheim, Covell & Tummino LLP

(57) ABSTRACT

The invention relates to a method and to a device for the singulation of packages, especially for the singulation of parcels. The invention is based on the assumption that the parcels are initially present as a bulk flow. The packages are transported in the form of a package flow on fifteen different transport means at different transport speeds, whereby the transport direction is deflected at least once by approximately 90°.

13 Claims, 5 Drawing Sheets

(56) References Cited

U.S. PATENT DOCUMENTS

Figure 1:
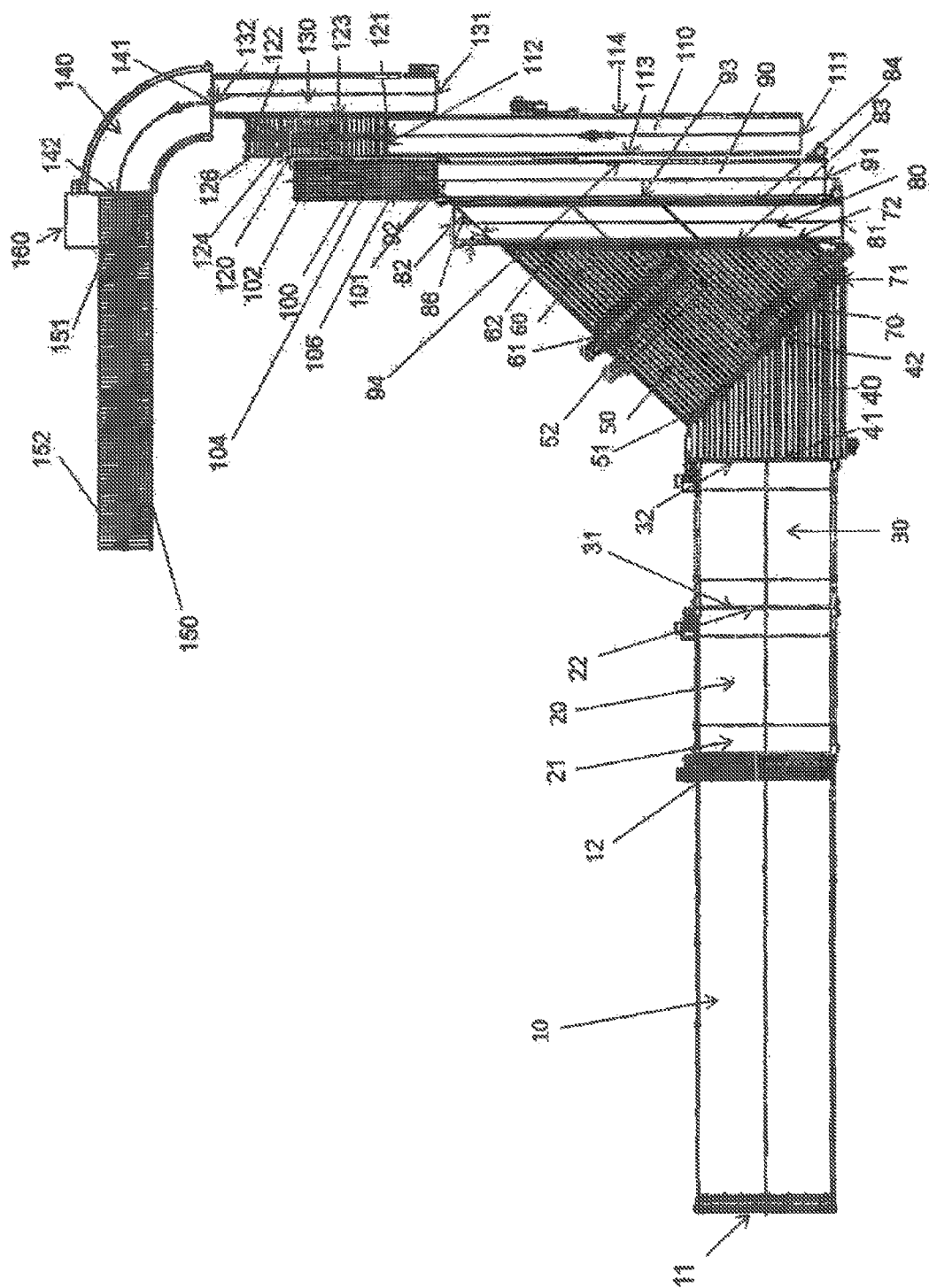

| | | | |
|---|---|---|---|
| 2009/0229953 A1 | 9/2009 | Pressler et al. | |
| 2011/0215036 A1 | 9/2011 | Fourney et al. | |
| 2013/0259629 A1* | 10/2013 | Aposhian | A01B 45/045 414/788.1 |
| 2014/0262686 A1* | 9/2014 | Schroader | B65G 47/22 198/455 |

FOREIGN PATENT DOCUMENTS

| | | | |
|---|---|---|---|
| DE | 4332341 A1 | 3/1995 | |
| DE | 69823060 T2 | 8/2004 | |
| EP | 1382553 A1 | 1/2004 | |
| EP | 2052998 B1 * | 5/2011 | B65G 47/682 |
| WO | 90/11142 | 10/1990 | |
| WO | 1999003765 A1 | 1/1999 | |
| WO | 2007108852 A2 | 9/2007 | |
| WO | 2009029091 A1 | 3/2009 | |

* cited by examiner

SORTING OF PACKAGES

CROSS REFERENCES TO RELATED APPLICATIONS

This application filed under 35 U.S.C § 371 is a national phase application of International Application Serial Number PCT/EP2014/057565 filed Apr. 15, 2014, which claims priority to German Application 102013206790.9, filed Apr. 16, 2013.

The invention relates to a method and to a device for the singulation of packages, especially for the singulation of parcels.

Logistics companies transport parcels, for example, as mailpieces, from a sender to a recipient. In this process, the parcels are normally first transported to parcel centers, the outgoing centers, where they are sorted according to recipient regions. From there, they are collected and transported to other parcel centers, the incoming centers, located in the appertaining recipient region. There, the parcels can be sorted into sub-centers from where they can be delivered to the recipient address. Large volumes of parcels are delivered to the parcel centers daily. Due to the large volume, these parcels can only be sorted cost-effectively if this is done automatically. However, conventional sorting systems require a flow of individual parcels. The parcels are usually delivered to the parcel centers in trucks that are unloaded, for example, with an unloading module. In this process, the parcels are fed into the sorting system in the form of an unordered pile of parcels, a so-called bulk flow. The parcels are present in this bulk flow as a three-dimensional pile, that is to say, the parcels are behind each other, next to each other and on top of each other. Here, the parcels can have different sizes in all three dimensions. Moreover, the parcels are not necessarily cuboidal, but rather they can have all kinds of shapes, they can especially be cylindrical. Moreover, the parcels can also be of different weights.

In the state of the art, handling devices and robots are known for singulation purposes. For example, European patent application EP 0499899 A1 discloses a device for the singulation of bulk goods made up of parcels having varying cross sections and different lengths. The parcels are transported by a first conveyor to the singulation station, where the parcels are picked up with grippers and placed individually onto a second conveyor.

Moreover, the person skilled in the art is very familiar with gantry robots. Such gantry robots have, for example, a gripping arm and can have four or more degrees of freedom. Such robots can grip parcels and place them individually somewhere else.

In order for such handling equipment and robots to be able to grip parcels, it is advantageous if the parcels are standing still at the moment when they are picked up. A sensor system has to detect the orientation of the parcels so that the gripper can approach the parcel in question in the correct position. Grippers and robots are demanding to manufacture and thus relatively expensive. The requisite sensor system adds to the cost of such devices. Furthermore, several such devices have to be used in parallel so that they can cope with the usual volume of parcels encountered in parcel centers.

Before this backdrop, the objective of the invention is to put forward a method and a device for the singulation of mailpieces that are present in the form of a bulk flow, especially parcels, said method and device minimizing the above-mentioned drawbacks of prior-art systems.

The method according to the invention for the singulation of parcels is based on the assumption that the parcels are initially present as unsorted piles extending in all three dimensions, that is to say, as a so-called bulk flow. Here, the parcels are in front of each other, next to each other and on top of each other. According to the invention, the parcels are transported in the form of a package flow on at least two different transport means at different transport speeds, whereby the transport direction is deflected at least once by at least 30°. Preferably, the transport direction is deflected at least once by at least approximately 45°, especially preferably by approximately 90°. In this process, the package flow is first spread out on a plane in that packages that are on top of each other are made to fall. In part subsequently and in part parallel to this, the two-dimensional package flow that forms is thus transformed into a single layer and a single file—that is to say, a one-dimensional—package flow, which is done in that the available surface area is enlarged and the package flow is subsequently merged.

In an advantageous refinement of the method according to the invention, during the transport on the at least two different transport means, the packages are transported at different heights.

For the singulation, it has proven to be advantageous for the package flow to be divided into several package flows in the at least one deflection, whereby it is also advantageous for the multiple package flows to be transported at different transport speeds.

After the division into several package flows, in an advantageous embodiment of the method according to the invention, the package flows are once again merged into a single package flow.

In an especially advantageous embodiment, the packages are transported on fifteen different transport means and singulated in the process.

Here, the packages are transported horizontally by a first transport means at a first transport speed, whereby the first transport means has a starting side and an outlet side arranged downstream from it in the transport direction. The first transport means can have side guides that prevent packages from falling off the side of the first transport means. The packages can spread sideways all the way to the side guides. Since the packages are positioned in the form of bulk goods on the transport means that is transporting the bulk flow, movements occur between the packages relative to each other, between the packages and the transport means, and between the packages and the side guides. In an advantageous embodiment, the first transport means is a slat chain conveyor. It has also proven to be advantageous for the first transport means to transport the packages at a first transport speed of approximately 1.5 m/min.

The packages are then transferred to a second transport means that has an inlet side and an outlet side arranged downstream from it in the transport direction, whereby the inlet side of the second transport means is arranged so as to be at a lower level than the outlet side of the first transport means, and whereby the second transport means is configured so as to rise at a first angle of ascent $\alpha_1$ in the transport direction. The angle of ascent $\alpha_1$ can be between 1° and 25°, preferably between 7° and 15°. During the transfer to the lower inlet side, the three-dimensional package flow breaks up for the first time. The packages are transported on the second transport means at a higher speed than on the first transport means. For example, tripling the speed is equivalent to tripling the surface area while retaining the width. Here, it has proven to be advantageous for the surface of the second conveying means to be configured with a particularly good nonskid surface so that, after being transferred, the packages acquire the higher speed as abruptly as possible so that, in case of packages that are stacked on top of each other, the bottom package is carried along whereas, due to inertia, the packages above it are not carried along as quickly, as a result of which they fall off the bottom package. In an advantageous embodiment, the second transport speed is approximately 4 m/min. The three-dimensional package flow continues to move in several lines next to each other and also in several layers on top of each other, but it is flatter than on the first transport means. The second transport means can have side guides, for example, with a smooth surface that prevent packages from falling off the side of the transport means.

The packages are then transferred to a third transport means that has an inlet side and an outlet side arranged downstream from it in the transport direction, whereby the inlet side of the third transport means is once again arranged so as to be at a lower level than the outlet side of the preceding transport means, and whereby the third transport means is configured so as to rise at a second angle of ascent $\alpha_2$ in the transport direction. The angle of ascent $\alpha_2$ here is between 1° and 25°, preferably between 7° and 15°. The packages are transported on the third transport means at a once again higher transport speed than on the preceding transport means. For example, the third transport speed can be approximately 7 m/min. As a result, additional packages that are on top of each other fall off each other. Packages are pulled away from below, as a result of which packages continue to slide from above, unordered but relatively slowly. The bulk flow, in turn, becomes flatter and longer. The third transport means can have side guides, for example, with a smooth surface that prevent packages from falling off the side of the transport means.

In an advantageous embodiment, the second transport means is a belt conveyor. Here, the third transport means can likewise be a belt conveyor.

Subsequently, the packages are transferred to a fourth transport means that has an inlet side and an outlet side arranged downstream from it in the transport direction, whereby the inlet side of the fourth transport means is arranged so as to be at a lower level than the outlet side of the third transport means. The packages are transported on the fourth transport means at a once again higher speed. For example, this new transport speed can be more than four times higher than the transport speed of the preceding transport means, as a result of which the package flow is markedly spread out. In an advantageous embodiment, the fourth transport speed is approximately 32 m/min. Large gaps are created between the packages.

Now there are only very few packages lying on top of each other. The fourth transport means can have side guides, for example, with a smooth surface that prevent packages from falling off the side of the transport means.

From the fourth transport means, a first portion of the packages is transferred to a fifth transport means that has an inlet side and an outlet side arranged downstream from it in the transport direction, while a second portion of the packages is transferred to a seventh transport means that has an inlet side and an outlet side arranged downstream from it in the transport direction and that is arranged essentially parallel to the fifth transport means, whereby the inlet sides of the fifth and seventh transport means are arranged at an angle of approximately 45° relative to the outlet side of the fourth transport means. This brings about a widening of the conveying surface area, as a result of which, due to the steady increase in speed, the packages create gaps not only behind each other, but also next to each other. The first portion of the packages is transported on the fifth transport means at a fifth transport speed, whereby the fifth transport speed is greater than the fourth transport speed. The second portion of the packages is transported on the seventh transport means at a seventh transport speed, whereby the seventh transport speed is greater than the fourth transport speed. Transport speeds of, for example, 40 m/min for the fifth transport means and of 70 m/min for the seventh transport means have proven to be advantageous.

The first portion of the packages is transferred to a sixth transport means that has an inlet side and an outlet side arranged downstream from it in the transport direction, and this portion is transported on the sixth transport means at a sixth transport speed, whereby the sixth transport speed is greater than the fifth transport speed, as a result of which the package flow is further spread out. A sixth transport speed of approximately 50 m/min has proven to be advantageous. The fifth and sixth transport means can have side guides, for example, with a smooth surface on their outside—that is to say, on the side opposite from the seventh transport means— that prevent packages from falling off the side of the transport means. By the same token, on its side opposite from the fifth and sixth transport means, the seventh transport means can have a side guide, for example, with a smooth surface that prevents packages from falling off the side of the transport means.

It has proven to be advantageous for the fourth and/or fifth and/or sixth and/or seventh transport means to be a strip conveyor. In particular, a strip conveyor can very easily establish the connection to a preceding or subsequent transport means at an angle, for example, at an angle of 45°.

Subsequently, via a first lengthwise side of an eighth transport means that is adjacent to the outlet sides of the sixth and seventh transport means, the first and second portions of the packages are transferred to an eighth transport means that has an inlet side, an outlet side arranged downstream from it in the transport direction, and a second lengthwise side, whereby the second lengthwise side is arranged essentially parallel to the first lengthwise side, and the lengthwise sides are arranged at an angle of approximately 45° relative to the outlet sides of the sixth and seventh transport means, and whereby the eighth transport means is slanted around its longitudinal axis by an angle of inclination $\beta_1$ in such a way that its first lengthwise side is at a higher level than its second lengthwise side. The angle of inclination $\beta_1$ can be between 10° and 40°, preferably between 20° and 25°. The eighth transport means is arranged in such a way that its first lengthwise side is at a lower level than the outlet sides of the sixth and seventh transport means. The eighth transport means can have at least one deflector that is affixed in a direction slanted essentially by 45° relative to the lengthwise direction of the eighth transport means at such a height above the eighth transport means that the movement of the transport means is not hindered while packages being transported on the transport means are deflected by the deflector out of the transport direction prescribed by the transport means. As a result, the package flow is divided further. Moreover, due to this deflector, packages that are very tightly stuck on the eighth transport means are not necessarily transported all the way to the outlet side of the eighth transport means where they might cause a jam. The packages are transported on the eighth transport means at an eighth transport speed, whereby the eighth transport speed is lower than the sixth and seventh transport speeds. A transport speed of approximately 32 m/min has proven to be advantageous.

The packages are transferred via the second lengthwise side of the eighth transport means to a ninth transport means that has an inlet side, an outlet side as well as a first lengthwise side and a second lengthwise side, whereby the packages are transferred to the ninth transport means via the first lengthwise side of the ninth transport means, and whereby the ninth transport means is slanted around its longitudinal axis by an angle of inclination $\beta_2$ in such a way that its first lengthwise side is at a higher level than its second lengthwise side. Here, the angle of inclination $\beta_2$ can be between 5° and 25°, preferably between 9° and 14°. The packages are transported on the ninth transport means at a ninth transport speed, whereby the ninth transport speed of, for example, approximately 50 m/min is higher than the eighth transport speed.

A first batch of packages is transferred to a tenth transport means that has an inlet side and an outlet side arranged downstream from it in the transport direction, and the remaining second batch of packages is transferred to an eleventh transport means that has an inlet side and an outlet side arranged downstream from it in the transport direction and that is arranged essentially parallel to the ninth transport means, as well as a first lengthwise side facing the ninth transport means and a second lengthwise side opposite from the first lengthwise side, whereby the tenth and eleventh transport means are arranged essentially horizontally, and the outlet side of the ninth transport means is located in a position that is higher than or equal to that of the inlet side of the tenth transport means, and the second lengthwise side of the ninth transport means is at a position that is higher than or equal to that of the first lengthwise side of the eleventh transport means, and whereby the remaining second batch of packages is transferred from the ninth transport means to the eleventh transport means via the second lengthwise side of the ninth transport means and via the first lengthwise side of the eleventh transport means. The first batch of packages is transported on the tenth transport means at a tenth transport speed, whereby the tenth transport speed is greater than the ninth transport speed. The remaining second batch of packages is transported on the eleventh transport means at an eleventh transport speed, whereby the eleventh transport speed is greater than the ninth transport speed and the tenth transport speed. Transport speeds of approximately 60 m/min for the tenth transport speed and of approximately 100 m/min for the eleventh transport speed have proven to be advantageous.

A first portion of the first batch of packages is transferred to the eleventh transport means, whereby it is transferred from the second lengthwise side of the ninth transport means to the first lengthwise side of the eleventh transport means. The remaining portion of the first batch of packages is transferred to a twelfth transport means that has an inlet side and an outlet side arranged downstream from it in the transport direction, as well as a first lengthwise side adjacent to the second lengthwise side of the tenth transport means and a second lengthwise side opposite from the first lengthwise side, whereby the remaining portion of the first batch of packages is transferred to the twelfth transport means via the second lengthwise side of the tenth transport means and via the first lengthwise side of the twelfth transport means. The second batch of packages is transferred to the twelfth transport means via the outlet side of the eleventh transport means and via the inlet side of the twelfth transport means. The packages are transported on the twelfth transport means at a twelfth transport speed, whereby the twelfth transport speed is smaller than the tenth and eleventh transport speeds. For example, the twelfth transport speed can be approximately 50 m/min. Subsequently, the packages are transferred to a thirteenth transport means that has an inlet side and an outlet side arranged downstream from it in the transport direction, and they are transported further on the thirteenth transport means at a thirteenth transport speed, whereby the thirteenth transport speed is greater than the twelfth transport speed. A thirteenth transport speed of approximately 150 m/min, which is markedly higher than the twelfth transport speed, has proven to be advantageous.

Since the eighth, ninth and eleventh conveying means are arranged as cascading conveying means set up essentially in parallel, the packages have the freedom to drop down sideways onto lower conveying means if they are being jostled laterally. The lower conveying means move at an increasing speed, whereby an increase of the speeds from, for example, 32 m/min as the eighth transport speed to 50 m/min as the ninth transport speed and all the way to 100 m/min as the eleventh transport speed has proven to be advantageous.

A slanted fixed deflector is mounted at each outlet side of the eighth, ninth and eleventh transport means, which are arranged essentially in parallel. These deflectors can also be made in one piece so that the deflector extends over all three outlet sides. The deflectors are mounted at angles $\gamma_1$, $\gamma_2$, $\gamma_3$, each between 10° and 80°, preferably between 15° and 50°, relative to the longitudinal axis of the conveying means. The deflector or deflectors, like a side guide, force the packages onto the next, parallel and somewhat lower conveying means, which also moves along at a greater speed. Another effect of this fixed, slippery side guide is that the packages generally nestle against it over their entire surface and are thus aligned. However, this alignment and nestling also depend on the weight and surface of the packages as well as on the coefficient of friction between the package and the surface of the conveying means in question. Therefore, it is advantageous for at least the last of these three cascaded conveying means to be configured as a roller conveyor with a very tight roller spacing. In an advantageous embodiment, the eighth, ninth and eleventh conveying means are belt conveyors, whereas the tenth conveying means is an inclined roller conveyor. In an especially preferred embodiment, the rollers of this inclined roller conveyor are arranged at an incline, as a result of which the effect of the slanted side guides is enhanced in that individual packages that have not yet slid onto the subsequent eleventh transport means due to the inclined arrangement of the eighth and ninth transport means are transferred to the right—as seen in the conveying direction—to the subsequent twelfth transport means. In addition, the packages are aligned on the side guide that is located on the left-hand side. In this area of the device, the package flow that had meanwhile been transformed from a three-dimensional package flow into a two-dimensional package flow is now transformed into a one-dimensional package flow. Some of the packages that were transported by the eighth, ninth and eleventh transport means to the twelfth transport means are still arranged next to each other. The packages that are in the front—as seen in the conveying direction—are aligned against the side guide of the twelfth transport means. If there are still packages arranged parallel to each other, then these packages are pushed in parallel to the right—as seen in the conveying direction—by the side guide. In an especially advantageous embodiment, the twelfth conveying means is configured as an accumulating roller conveyor on which the packages are accumulated to form a two-dimensional package flow. If the accumulating roller conveyor is configured as an inclined roller conveyor, then the effect brought approximately by the inclined side guide, namely, that the packages are transferred to the subsequent thirteenth transport means, is enhanced. The right-hand package of the two packages that are arranged in parallel is first pushed onto the thirteenth transport means, which moves considerably faster. Here, a thirteenth transport speed that is greater than the twelfth transport speed by a factor of about three has proven to be advantageous. In addition, it is advantageous for the surface of the thirteenth transport means to be configured with a particularly good nonskid surface so as to ensure a high degree of friction between the packages and the surface of the transport means. In an especially advantageous embodiment, the thirteenth transport means is a belt conveyor that runs at approximately 150 m/min and that has a transport belt surface with a particularly has a transport belt with a particularly good nonskid surface. Consequently, packages picked up by this belt are pulled away so that, on the thirteenth transport means, there are practically no more packages next to each other and the package flow is one-dimensional.

The packages are transferred from the thirteenth transport means to a fourteenth transport means that has an inlet side and an outlet side arranged downstream from it in the transport direction, whereby the fourteenth transport means describes an arc of approximately 90°. The packages are transported on the fourteenth transport means at a fourteenth transport speed, whereby the fourteenth transport speed is once again greater than the thirteenth transport speed. For example, a fourteenth transport speed of approximately 160 m/min has proven to be especially advantageous. Here, the high curve speed means that rotation-symmetrical packages such as, for instance, tubes can roll to the outside of the transport means due to centrifugal force and can be fed into a container located at the outlet of the curve. In a preferred embodiment, a side guide with a smooth surface is provided for this purpose, at least on the outer radius of this conveying means. In a preferred embodiment, the fourteenth transport means is configured as a curved belt conveyor. The width of the fourteenth transport means is smaller than that of the subsequent fifteenth transport means, which is aligned so as to adjoin the inner radius of the fourteenth transport means. In this way, unsortable rotation-symmetrical packages can be segregated and collected.

At least a portion of the packages that was not segregated at the outlet side of the fourteenth transport means is transferred to a fifteenth transport means that has an inlet side and an outlet side arranged downstream from it in the transport direction, and this portion is further transported on it. In an advantageous embodiment, the fifteenth transport means is an inclined roller conveyor. The packages being consecutively conveyed are now aligned in single-file on this transport means, also called an alignment conveyor.

Consequently, on the outlet side of the last, fifteenth transport means, there is a one-dimensional package flow from which the packages—aligned single-file—can be further processed, for example, sorted.

In another embodiment, at least one of the belt conveyors can have a continuous conveyor belt that is deflected by approximately 180° at the outlet side of the appertaining belt conveyor and that runs on the underside of the appertaining belt conveyor back to the inlet side of the appertaining belt conveyor, where it is once again deflected by approximately 180°, so that the conveyor belt runs on the top of the appertaining belt conveyor, once again in the direction of the outlet side, whereby at least one relative conveying means is recessed in the conveyor belt, whereby the relative conveying means has a rotating body that is mounted in a bearing so that it can rotate around itself and this rotating body is made to rotate while the conveyor belt is running on the underside of the belt conveyor. Here, the bearing can be configured in such a way that the rotating body can only rotate in one direction, preferably in the conveying direction, as a result of which an unwanted slowing down of the package flow can be prevented.

In another advantageous embodiment, while the conveyor belt is running on the underside of the belt conveyor, the rotating body is made to rotate due to friction against a surface that is stationary relative to the movement of the conveyor belt. This is an especially simple and effective method to make the rotating body rotate, without having to provide a dedicated drive for this purpose. The rotating body can be a ball. As an alternative, the rotating body can also be a roller.

In another advantageous embodiment, at least one of the outlet sides arranged higher in the vertical direction, for example, one of the outlet sides of the second and/or third transport means, has a ball caster chute, whereby the ball caster chute has a quarter-spherical shape and the uppermost point of the surface of the ball caster chute is at the same height as or at a lower height than the outlet side, and the foot of the ball caster chute extends in the widthwise direction approximately to the same extent as the width of the outlet side, whereby the inlet side of the next transport means is wider than the ball caster chute. Such a ball caster chute makes it possible to overcome the height difference between the outlet side of one transport means and the inlet side of the next transport means in a way that is very gentle for the packages, while retaining the effect that packages stacked on top of each other tip over when being transferred from one transport means to the next one.

Additional advantages, special features and practical refinements of the invention can be gleaned from the subordinate claims and from the presentation below of preferred embodiments with reference to the figures.

Figure 2:
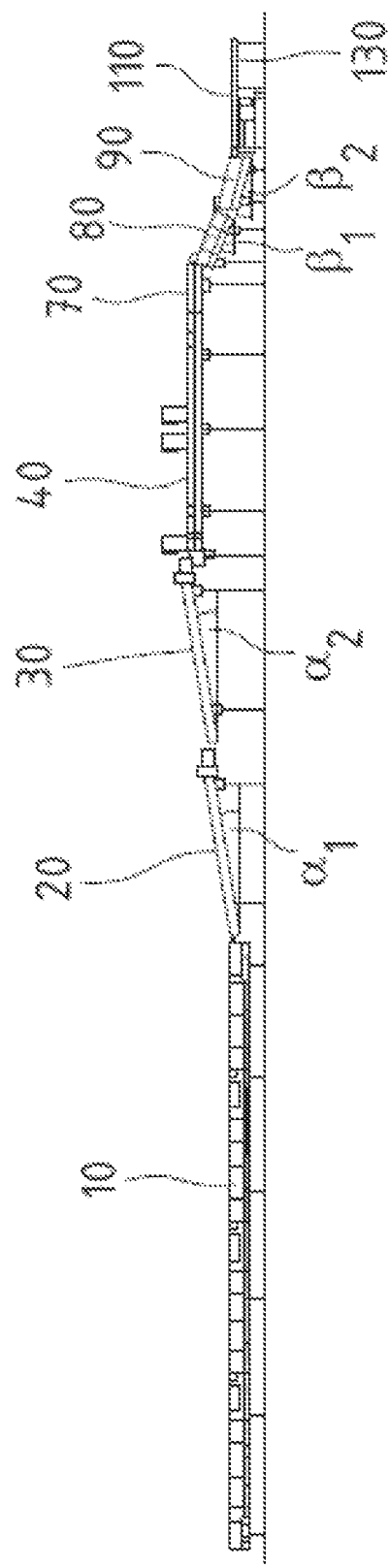
Figure 3:
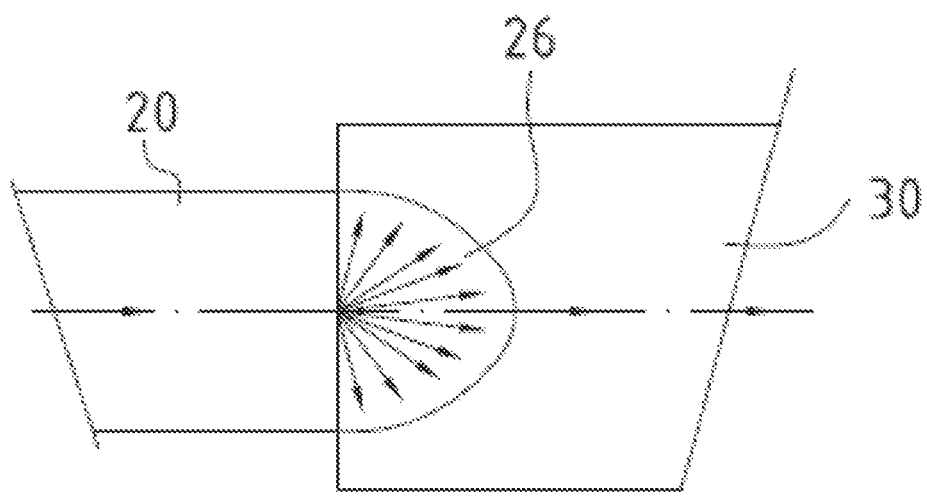
Figure 4:
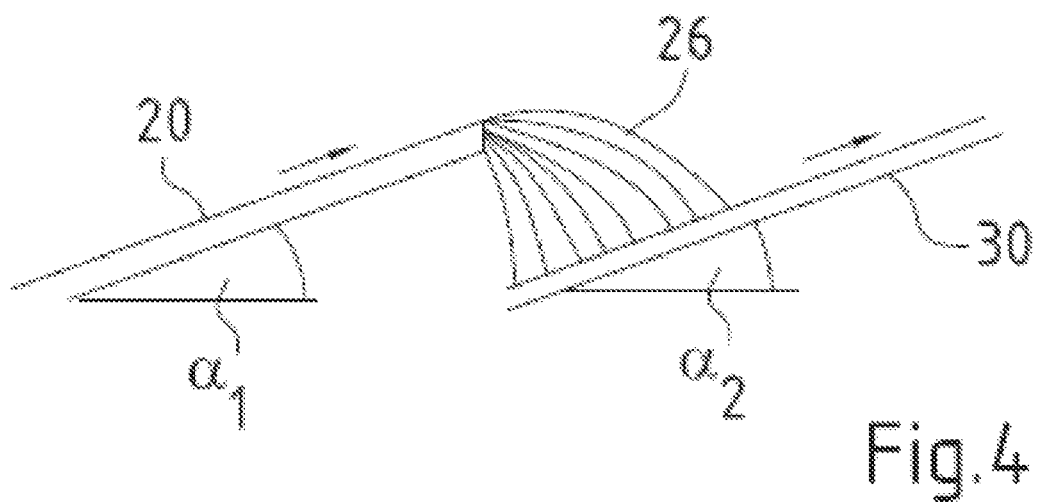
Figure 5:
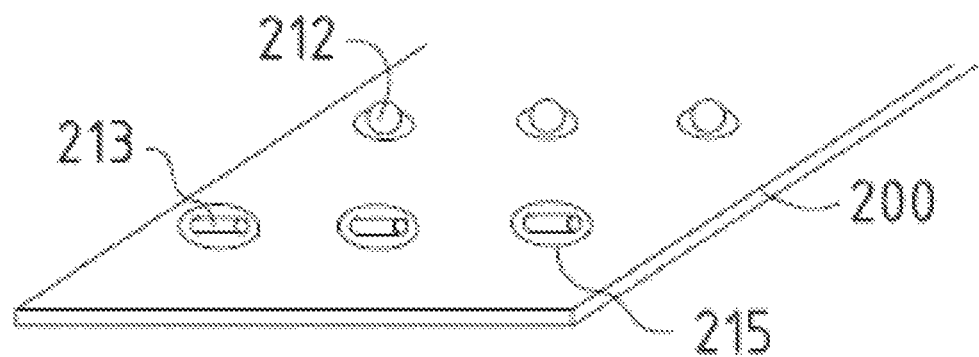

The figures show the following:

FIG. 1 a top view of a device according to the invention, having fifteen transport means;

FIG. 2 a side view of the device according to the invention as shown in FIG. 1;

FIG. 3 a top view of a ball caster chute according to the invention;

FIG. 4 a side view of a ball caster chute according to the invention;

FIG. 5 a top view of a conveyor belt according to the invention, with recessed relative conveying means.

FIG. 1 shows a top view of a device according to the invention having fifteen transport means, for the singulation of packages. The packages 1 that are to be singulated are fed to the device in the form of a three-dimensional pile, a so-called bulk flow, on the first transport means 10. The packages 1 are not shown in the figure. In this bulk flow, the parcels are behind each other, next to each other and on top of each other. The first transport means is configured as a slat chain conveyor that has an inlet side 11 and an outlet side 12. The packages 1 are transported by means of the first transport means 10 at approximately 1.5 m/min in the direction of the subsequent second transport means 20. The slat chain conveyor has side guides (not shown here) that prevent packages from falling off the side of the transport means 10. The packages 1 can spread sideways all the way to the side guides. Since the packages 1 are positioned in the form of bulk goods on the slat chain conveyor 10, movements occur between the packages 1 relative to each other, between the packages 1 and the transport means 10 and between the packages 1 and the side guides.

The packages 1 are then transferred to a second transport means 20 in the form of a belt conveyor that has an inlet side 21 and an outlet side 22 arranged downstream from it in the transport direction, whereby the inlet side 21 of the second transport means 20 is arranged so as to be at a lower level than the outlet side 11 of the first transport means 10, and whereby the second transport means 20 is configured so as to rise at a first angle of ascent $\alpha_1$ of 9° in the transport direction. During the transfer to the lower inlet side 21, the three-dimensional package flow breaks up for the first time. Here, the height difference between the outlet side of the first transport means 10 and the inlet sides of the second transport means 20 is approximately 20 mm. The packages 1 are transported on the second transport means 20 at a speed of 4 m/min. The belt of the second transport means 20 has a particularly good nonskid surface. Consequently, after being transferred, the packages 1 abruptly acquire the higher speed, as a result of which, in case of packages 1 that are stacked on top of each other, the bottom package 1 is carried along whereas, due to inertia, the packages 1 above it are not carried along as quickly, as a result of which they fall off the bottom package 1. The three-dimensional package flow continues to move in several lines next to each other and also in several layers on top of each other, but it is flatter than on the first transport means 10. The second transport means 20 has side guides with a smooth surface that prevent packages from falling off the side of the transport means 20.

The packages 1 are then transferred to a third transport means 30 that has an inlet side 31 and an outlet side 32 arranged downstream from it in the transport direction, whereby the inlet side 31 of the third transport means 30 is once again arranged approximately 20 mm at a lower level than the outlet side 22 of the preceding second transport means 20, and whereby the third transport means is configured so as to rise at a second angle of ascent $\alpha_2$ of 9° in the transport direction. The packages 1 are transported on the third transport means 30, which is likewise configured as a belt conveyor, at a once again higher transport speed of approximately 7 m/min than on the preceding second transport means 20. As a result, additional packages 1 that are on top of each other fall off each other. Packages 1 are pulled away from below, as a result of which packages 1 continue to slide from above, unordered but relatively slowly. The bulk flow, in turn, becomes flatter and longer. The third transport means 30 likewise has side guides (not shown here) with a smooth surface that prevent packages 1 from falling off the side of the transport means 30.

Subsequently, the packages 1 are transferred to a fourth transport means 40 that has an inlet side 41 and an outlet side 42 arranged downstream from it in the transport direction, whereby the inlet side 41 of the fourth transport means 40 is arranged approximately 20 mm at a lower level than the outlet side 32 of the third transport means 30. The packages 1 are transported on the fourth transport means 40 at a once again higher transport speed of approximately 32 m/min. As a result, the package flow is markedly spread out. Large gaps are created between the packages 1. Now there are only very few packages lying on top of each other. The fourth transport means 40 is configured as a strip conveyor and has side guides (not shown here) with a smooth surface that prevent packages from falling off the side of the transport means 40.

From the fourth transport means 40, a first portion of the packages 1 is transferred to a fifth transport means 50 that has an inlet side 51 and an outlet side 52 arranged downstream from it in the transport direction, while a second portion of the packages 1 is transferred to a seventh transport means 70 that has an inlet side 71 and an outlet side 72 arranged downstream from it in the transport direction and that is arranged essentially parallel to the fifth transport means 50, whereby the inlet sides 51, 71 of the fifth and seventh transport means 50, 70 are arranged at an angle of approximately 45° relative to the outlet side of the fourth transport means 40. This brings about a widening of the conveying surface area, as a result of which the packages 1 create not only gaps behind each other due to the steady increase in speed, but also gaps next to each other. The first portion of the packages 1 is transported on the fifth transport means 50 at a speed of approximately 40 m/min. The second portion of the packages 1 is transported on the seventh transport means 70 at a speed of approximately 70 m/min.

The first portion of the packages 1 is transported from the fifth transport means 50 to a sixth transport means 60 that has an inlet side 61 and an outlet side 62 arranged downstream from it in the transport direction, and this portion is transported on the sixth transport means 60 at a sixth transport speed of approximately 50 m/min. As a result, the package flow is further spread out. The fifth and sixth transport means 50, 60 have side guides with a smooth surface on their outside—that is to say, on the side opposite from the seventh transport means 70 (not shown here)—that prevent packages 1 from falling off the side of the transport means. By the same token, the seventh transport means 70 have side guides (not shown here) with a smooth surface on their outside—that is to say, on the side opposite from the fifth and sixth transport means—that prevent packages 1 from falling off the side of the transport means 70. Since the fifth, sixth and seventh transport means 50, 60, 70 are arranged by approximately 45° relative to the longitudinal axis of the fourth transport means 40, this brings about a widening of the available transport width. Here, the width of the inlet side 41 of the fourth transport means 40 is approximately 2.20 m, whereas the total outlet width 61, 71 of the parallel sixth and seventh transport means 60, 70 is over 5 meters. Strip conveyors are used as the fourth, fifth, sixth and seventh transport means 40, 50, 60, 70. In particular, a strip conveyor can very easily establish the connection to a preceding or subsequent transport means 30, 80 at an angle of 45°.

Subsequently, via a first lengthwise side 83 of an eighth transport means 80 that is adjacent to the outlet sides 62, 72 of the sixth and seventh transport means 60, 70, the first and second portions of the packages 1 are transferred to an eighth transport means 80 that has an inlet side 81, an outlet side 82 arranged downstream from it in the transport direction, and a second lengthwise side 84, whereby the second lengthwise side 84 is arranged essentially parallel to the first lengthwise side 83, and the lengthwise sides 83, 84 are arranged at an angle of approximately 45° relative to the outlet sides 62, 72 of the sixth and seventh transport means 60, 70, and whereby the eighth transport means 80 is slanted around its longitudinal axis by an angle of inclination $\beta_1$ of approximately 22.5° in such a way that its first lengthwise side 83 is at a higher level than its second lengthwise side 84. The eighth transport means 80 is arranged in such a way that its first lengthwise side 83 is at a lower level than the outlet sides 61, 71 of the sixth and seventh transport means 60, 70. The eighth transport means 80 has three deflectors 85, 86, 106 that are affixed in a direction slanted essentially by 45° relative to the lengthwise direction of the eighth transport means 80 at such a height above the eighth transport means 80 that the movement of the transport means 80 is not hindered. Packages 1 transported on the transport means 80 are divided by the middle deflectors 85, 86 into individual package flows. For this purpose, the deflectors 85, 86 are of such a height that they extend, at the most, up to the surface of the sixth and seventh transport means 60, 70. The last deflector 106 is located near the outlet side 82 of the eighth transport means 80 and—as seen in the transport direction of the eighth transport means 80—it is arranged in such a way that it is situated behind the left-hand outside of the sixth transport means 60—as seen in the transport direction of the sixth transport means 60—as a result of which packages 1 are prevented from leaving the device via the outlet side 82 of the eighth transport means and, at the same time, no packages 1 can fall off the sixth transport means 60 behind the deflector 106—as seen in the transport direction of the eighth transport means 80. Moreover, due to the deflectors 85, 86, packages 1 that are very tightly stuck on the eighth transport means 80 are not necessarily transported all the way to the outlet side 81 of the eighth transport means where they might cause a jam. The packages 1 are transported on the eighth transport means 80 at an eighth transport speed of 32 m/min. The eighth transport means is configured as a belt conveyor.

The packages are transferred via the second lengthwise side 84 of the eighth transport means 80 to a ninth transport means 90 that has an inlet side 91, an outlet side 92 as well as a first lengthwise side 93 and a second lengthwise side 94, whereby the packages 1 are transferred to the ninth transport means 90 via the first lengthwise side 93 of the ninth transport means 90, and whereby the ninth transport means 90 is slanted around its longitudinal axis by an angle of inclination $\beta_2$ of approximately 11° in such a way that its first lengthwise side 93 is at a higher level than its second lengthwise side 94. The packages 1 are transported on the ninth transport means 90 at a ninth transport speed of 50 m/min. The ninth transport means 90 is configured as a belt conveyor.

A first batch of packages 1 is transferred to a tenth transport means 100 that has an inlet side 101 and an outlet side 102 arranged downstream from it in the transport direction, while the remaining second batch of packages 1 is transferred to an eleventh transport means 110 that has an inlet side 111 and an outlet side 112 arranged downstream from it in the transport direction and that is arranged essentially parallel to the ninth transport means 90, as well as a first lengthwise side 113 facing the ninth transport means 90, and a second lengthwise side 114 opposite from the first lengthwise side 113, whereby the tenth and eleventh transport means 100, 110 are arranged essentially horizontally, and the outlet side 92 of the ninth transport means 90 is located in a position that is higher than or equal to that of the inlet side 101 of the tenth transport means 100, and the second lengthwise side 94 of the ninth transport means 90 is at a position that is higher than or equal to that of the first lengthwise side 113 of the eleventh transport means 110, and whereby the remaining second batch of packages 1 is transferred from the ninth transport means 90 to the eleventh transport means 110 via the second lengthwise side 94 of the ninth transport means 90 and the first lengthwise side 113 of the eleventh transport means 110. The first batch of packages 1 is transported on the tenth transport means 100 at a tenth transport speed of approximately 60 m/min. The remaining second batch of packages 1 is transported on the eleventh transport means 110 at an eleventh transport speed of approximately 100 m/min. The tenth transport means 100 is configured as an inclined roller conveyor, whereas the eleventh transport means 110 is configured as a belt conveyor.

A first portion of the first batch of packages 1 is transferred to the eleventh transport means 110, a process in which it is transferred from the second lengthwise side 94 of the ninth transport means 90 to the first lengthwise side 113 of the eleventh transport means 110. The remaining portion of the first batch of packages 1 is transferred to a twelfth transport means 120 that has an inlet side 121 and an outlet side 122 arranged downstream from it in the transport direction, as well as a first lengthwise side 123 adjacent to the second lengthwise side 104 of the tenth transport means 100 and a second lengthwise side 124 opposite from the first lengthwise side 123, whereby the remaining portion of the first batch of packages 1 is transferred to the twelfth transport means 120 via the second lengthwise side 104 of the tenth transport means 100 and via the first lengthwise side 123 of the twelfth transport means 120. The second batch of packages 1 is transferred to the twelfth transport means 120 via the outlet side 111 of the eleventh transport means 110 and via the inlet side 121 of the twelfth transport means 120. The packages 1 are transported on the twelfth transport means 120 at a twelfth transport speed of approximately 20 m/min. The twelfth transport means 120 is configured as an accumulating roller conveyor. Subsequently, the packages 1 are transferred to a thirteenth transport means 130 that has an inlet side 131 and an outlet side 132 arranged downstream from it in the transport direction, and they are transported further on the thirteenth transport means 130 at a thirteenth transport speed of approximately 150 m/min. The thirteenth transport means 130 is configured as a belt conveyor.

Since the eighth, ninth and eleventh conveying means 80, 90, 110 are arranged as cascading conveying means 80, 90, 110 set up essentially in parallel, the packages 1 have the freedom to drop down sideways onto lower conveying means 90, 110 if they are being jostled laterally. The lower conveying means 90, 110 move at an increasing speed.

A slanted fixed deflector 106 is mounted at each outlet side 82, 92, 122 of the eighth, ninth and eleventh transport means 80, 90, 120, which are arranged essentially in parallel. Here, this deflector is configured in two pieces, whereby a first piece is mounted on the outlet side 82 of the eighth transport means 80 and the second piece extends over the tenth transport means 100 and over the twelfth transport means 120. The angles $\gamma_1$, $\gamma_2$ of the two pieces of the deflector 106 relative to the longitudinal axes of the transport means 80, 90, 110, 100, 120 are different here. Thus, the angle $\gamma_1$ of the piece of the deflector 106 that is mounted on the eighth transport means 80 is approximately 45° relative to the longitudinal axis of this transport means 80, whereas the second piece of the deflector 106 extending over the tenth and twelfth transport means 100, 120 forms an angle $\gamma_2$ of 22.5° relative to the longitudinal axes of the transport means 80, 90, 110, 100, 120. However, the deflector 106 can also be configured in one piece so that it extends at the same angle over all three outlet sides. However, it is also possible to configure the deflector 106 in three pieces, whereby, on the transport means 80, 100, 120, it can have a different angle $\gamma_1$, $\gamma_2$, $\gamma_3$ relative to the longitudinal axis of the appertaining transport means 80, 100, 120. The deflector 106, like a side guide, forces the packages 1 onto the next, parallel and somewhat lower conveying means 90, 120 or 130, whereby these conveying means 90, 120, 130 also move along at a greater speed as compared to the preceding transport means. Another effect of this fixed, slippery deflector 106 is that the packages 1 generally nestle against it over their entire surface and are thus aligned. However, this alignment and nestling also depend on the weight and surface of the packages 1 as well as on the coefficient of friction between the package 1 and the surface of the conveying means 80, 100, 120 in question. Therefore, the last of these three cascaded conveying means 130 is configured as a roller conveyor with a very tight roller spacing.

The tenth conveying means 100 is an inclined roller conveyor, whereby the rollers are arranged at an incline, as a result of which the effect of the slanted deflector 106 is enhanced in that individual packages 1 that have not yet slid onto the subsequent eleventh transport means 110 due to the inclined arrangement of the eighth and ninth transport means 80, 90 are transferred to the right—as seen in the conveying direction—to the subsequent twelfth transport means 120. In addition, the packages 1 are aligned on the side guide that is located on the left-hand side. In this area of the device, the package flow that had meanwhile been transformed from a three-dimensional package flow into a two-dimensional package flow is now transformed into a one-dimensional package flow. Some of the packages that were transported by the eighth, ninth and eleventh transport means 80, 90, 110 to the twelfth transport means 120 are still next to each other. The packages 1 that are in the front—as seen in the conveying direction—are aligned against the side guide of the twelfth transport means 120. If packages 1 are still parallel to each other, then these packages 1 are pushed in parallel to the right—as seen in the conveying direction—by the side guide. The twelfth conveying means 120 is configured as an accumulating roller conveyor on which the packages 1 are accumulated to form a two-dimensional package flow. If the accumulating roller conveyor 120 is configured as an inclined roller conveyor, then the effect brought approximately by the inclined deflector 106, namely, that the packages 1 are transferred to the subsequent thirteenth transport means 130, is enhanced. The right-hand package 1 of the two packages 1 that are arranged in parallel is first pushed onto the thirteenth transport means 130, which moves considerably faster. The surface of the thirteenth transport means 130, which is configured as a belt conveyor, is configured with a particularly good nonskid surface so as to ensure a high degree of friction between the packages 1 and the surface of the transport means. Packages 1 picked up by the thirteenth transport means 130 are pulled away so that, on the thirteenth transport means 130, there are practically no more packages 1 next to each other and the package flow is one-dimensional.

The packages 1 are transferred from the thirteenth transport means 130 to a fourteenth transport means 140 that has an inlet side 141 and an outlet side 142 arranged downstream from it in the transport direction, whereby the fourteenth transport means 140 is a curved belt conveyor that describes an arc of approximately 90°. The packages 1 are transported on the fourteenth transport means 140 at a fourteenth transport speed, whereby the fourteenth transport speed is once again greater than the thirteenth transport speed, namely, approximately 160 m/min. Here, the high curve speed means that rotation-symmetrical packages 1 such as, for instance, tubes can roll to the outside of the transport means 140 due to centrifugal force and can be fed into a container 160 located at the outlet of the curve. A side guide with a smooth surface is provided for this purpose on the outer radius of this conveying means 140. The width of the fourteenth transport means 140 is smaller than that of the subsequent fifteenth transport means 150, which is aligned so as to adjoin the inner radius of the fourteenth transport means 140. In this way, unsortable rotation-symmetrical packages 1 can be segregated and collected.

At least a portion of the packages 1 that was not segregated at the outlet side 142 of the fourteenth transport means 140 is transferred to a fifteenth transport means 150 that has an inlet side 151 and an outlet side 152 arranged downstream from it in the transport direction, and this portion is further transported on it. The fifteenth transport means 150 is an inclined roller conveyor. The packages 1 being consecutively conveyed are now aligned in single-file on this transport means, also called an alignment conveyor.

Consequently, on the outlet side of the last, fifteenth transport means 150, there is a one-dimensional package flow from which the packages 1—aligned single-file—can be further processed, for example, sorted.

FIG. 2 shows a side view of the device according to the invention as shown in FIG. 1. The arrangement of the second and third transport means 20, 30 as an ascending belt conveyor can be seen. Here, the angles of inclination $\alpha_1$ and $\alpha_2$ are equal and amount to approximately 9°. However, the angles of inclination $\alpha_1$ and $\alpha_2$ can also acquire different values. The cascading arrangement of the second, third and fourth transport means 20, 30, 40 can also be seen, whereby the appertaining inlet sides 31, 41 of the third and fourth transport means 30, 40 are each situated approximately 20 mm below the outlet sides 22, 32 of the second and third transport means 20, 30. The arrangement of the eighth and ninth transport means 80, 90 inclined towards their longitudinal axis can also be seen, whereby the eighth transport means 80 is slanted by an angle of inclination $\beta_1$ of 22.5° and the ninth transport means is slanted by an angle of inclination $\beta_2$ of 11° relative to the longitudinal axes of the appertaining transport means 80, 90.

FIG. 3 shows a top view of a ball caster chute according to the invention. The outlet side 22 of the second and/or third transport means 20 arranged higher in the vertical direction has a ball caster chute 26, whereby the ball caster chute 26 has a quarter-spherical shape and the uppermost point of the surface of the ball caster chute is at the same height or at a lower height than the outlet side 22, and the foot of the ball caster chute 26 extends in the widthwise direction to the same extent as the width of the outlet side 22, whereby the inlet side 31 of the next transport means 30 is wider than the ball caster chute 26. Such a ball caster chute 26 makes it possible to overcome the height difference between the outlet side 22 of one transport means and the inlet side 31 of the next transport means 30 in a way that is very gentle for the packages 1, while retaining the effect that packages 1 stacked on top of each other tip over when being transferred from one transport means to the next one. The ball caster chute 26 can be made of metal, plastic, wood or a mixture of several of these materials. It has a smooth surface. As an alternative, it can also have a rough surface with a high coefficient of friction relative to the packages 1, thereby enhancing the described tipping effect of packages 1 that are stacked on top of each other and that are sliding through the ball caster chute 26.

FIG. 4 is a side view of a ball caster chute 26 according to the invention. In this view, the two angles of inclination $\alpha_1$ and $\alpha_2$ of the second and third transport means 20, 30 can be seen.

FIG. 5 is a top view of a conveyor belt 200 with recessed relative conveying means 212, 213. At least one of the belt conveyors 20, 30, 80, 90, 110, 130 can have a continuous conveyor belt 200 that is deflected at the outlet side 22, 32, 82, 92, 112, 132 of the appertaining belt conveyor 20, 30, 80, 90, 110, 130 by approximately 180° and that runs on the underside of the appertaining belt conveyor 20, 30, 80, 90, 110, 130 back to the inlet side 21, 31, 81, 91, 111, 131 of the appertaining belt conveyor 20, 30, 80, 90, 110, 130, where it is once again deflected by approximately 180°, so that the conveyor belt 200 runs on the top of the appertaining belt conveyor 20, 30, 80, 90, 110, 130, once again in the direction of the outlet side 22, 32, 82, 92, 112, 132, whereby at least one relative conveying means 212, 213 is recessed in the conveyor belt 200, whereby the relative conveying means 212, 213 has a rotating body 212, 213 that is mounted in a bearing 215 so that it can rotate around itself, and this rotating body 212, 213 is made to rotate while the conveyor belt 200 is running on the underside of the belt conveyor 20, 30, 80, 90, 110, 130. Here, the bearing 215 can be configured in such a way that the rotating body 212, 213 can only rotate in one direction, preferably in the conveying direction, as a result of which an unwanted slowing down of the package flow can be prevented. While the conveyor belt 200 is running on the underside of the belt conveyor 20, 30, 80, 90, 110, 130, the rotating body 212, 213 is made to rotate due to friction against a surface that is stationary relative to the movement of the conveyor belt 200. This is an especially simple and effective method to make the rotating body 212, 213 rotate, without having to provide a dedicated drive for this purpose. In this context, the rotating body 212 can be a ball. As an alternative, the rotating body 213 can also be a roller.

The embodiments shown here merely constitute examples of the present invention and therefore must not be construed in a limiting fashion. Alternative embodiments considered by the person skilled in the art are likewise encompassed by the scope of protection of the present invention.

LIST OF REFERENCE NUMERALS 1 package
10 first transport means
11 inlet side of the first transport means
12 outlet side of the first transport means
20 second transport means
21 inlet side of the second transport means
22 outlet side of the second transport means
26 ball caster chute
30 third transport means
31 inlet side of the third transport means
32 outlet side of the third transport means
40 fourth transport means
41 inlet side of the fourth transport means
42 outlet side of the fourth transport means
50 fifth transport means
51 inlet side of the fifth transport means
52 outlet side of the fifth transport means
60 sixth transport means
61 inlet side of the sixth transport means
62 outlet side of the sixth transport means
70 seventh transport means
71 inlet side of the seventh transport means
72 outlet side of the seventh transport means
80 eighth transport means
81 inlet side of the eighth transport means
82 outlet side of the eighth transport means
83 first lengthwise side of the eighth transport means
84 second lengthwise side of the eighth transport means
85 deflector
86 deflector
90 ninth transport means
91 inlet side of the ninth transport means
92 outlet side of the ninth transport means
93 first lengthwise side of the ninth transport means
94 second lengthwise side of the ninth transport means
100 tenth transport means
101 inlet side of the tenth transport means
102 outlet side of the tenth transport means
104 second lengthwise side of the tenth transport means
106 deflector
110 eleventh transport means
111 inlet side of the eleventh transport means
112 outlet side of the eleventh transport means
113 first lengthwise side of the eleventh transport means
114 second lengthwise side of the eleventh transport means
120 twelfth transport means
121 inlet side of the twelfth transport means
122 outlet side of the twelfth transport means
123 first lengthwise side of the twelfth transport means
124 second lengthwise side of the twelfth transport means
126 deflector
130 thirteenth transport means
131 inlet side of the thirteenth transport means
132 outlet side of the thirteenth transport means
140 fourteenth transport means
141 inlet side of the fourteenth transport means
142 outlet side of the fourteenth transport means
150 fifteenth transport means
151 inlet side of the fifteenth transport means
152 outlet side of the fifteenth transport means
160 container
200 conveyor belt
212 ball
213 roller
215 bearing
$\alpha_1$ first angle of ascent
$\alpha_2$ second angle of ascent
$\beta_1$ first angle of inclination
$\beta_2$ second angle of inclination
$\gamma_1, \gamma_2, \gamma_3$ angles

The invention claimed is:

1. A device for the singulation of packages, whereby the packages are initially present as a bulk flow, said device comprising a plurality of transport means (10, 20, 30, 40, 50, 60, 70, 80, 90, 100, 110, 120, 130, 140, 150), said plurality of transport means (10, 20, 30, 40, 50, 60, 70, 80, 90, 100, 110, 120, 130, 140, 150) having at least a first through a twelfth transport means and being arranged in a transport means sequence, said transport means sequence having at least a first deflection, whereby a first and a last part of a first portion (10, 20, 30, 40, 80, 100, 120, 130, 140, 150) of said plurality of transport means are arranged one behind the other, while another portion (50, 60, 70, 90, 110) of said plurality of transport means are arranged one behind the other and said second portion of said plurality of transport means is arranged to be at least partially in parallel with said first portion of said plurality of transport means, whereby at least one of the transport means (20, 30) of the first portion of the transport means (10, 20, 30, 40) is arranged so as to rise in the vertical direction, and another one of said plurality of transport means subsequent to said at least one of the transport means, as seen in the transport direction, is arranged so as to drop in the vertical direction, and whereby an outlet side (22, 32) of at least one transport means (20, 30) of the first portion of the plurality of transport means (10, 20, 30, 40) is arranged higher in the vertical direction than a subsequent inlet side (31, 41) of a subsequent transport means (30, 40), as seen in the transport direction, and whereby the inlet side (21, 31, 41, 51, 61, 71, 81, 91, 101, 111, 121, 131, 141, 151) of at least one of the plurality of transport means (20, 30, 40, 50, 60, 70, 80, 90, 100, 110, 120, 130, 140, 150) forms an angle of approximately 45° with an outlet side (12, 22, 32, 42, 52, 62, 72, 82, 92, 102, 112, 122, 132, 142) of an immediately preceding transport means (10,

20, 30, 40, 50, 60, 70, 80, 90, 100, 110, 120, 130, 140) and wherein at least an eight transport means that follows the first deflection has a first lengthwise side and a second lengthwise side, whereby the second lengthwise side is arranged essentially parallel to the first lengthwise side, and the lengthwise sides are arranged at an angle of approximately 45° relative to the outlet sides of a sixth and seventh transport means, and whereby the eighth transport means is slanted around its longitudinal axis by an angle of inclination $\beta_1$ in such a way that its first lengthwise side is at a higher level than its second lengthwise side.

2. The device according to claim 1 wherein
the transport means sequence has at least a second deflection.

3. The device according to claim 2, wherein
the transport means include belt conveyors, inclined roller conveyor, strip conveyors and accumulating roller conveyors.

4. The device according to claim 3, wherein
the transport means in the first deflection comprise strip conveyors.

5. The device according to claim 3, wherein
at least one transport means in the second deflection is a curved belt conveyor.

6. The device according to claim 3, whereby the belt conveyors have a continuous conveyor belt that is deflected by approximately 180° at the outlet side of an appertaining belt conveyor and that runs on the underside of the appertaining belt conveyor back to the inlet side of the appertaining belt conveyor, where it is once again deflected by approximately 180°, so that the conveyor belt runs on the top of the appertaining belt conveyor, once again in the direction of the outlet side,
wherein
at least one relative conveying means is recessed in a conveyor belt of at least one belt conveyor, whereby the relative conveying means has a rotating body that is mounted in a bearing so that it can rotate around itself and this rotating body is made to rotate while the continuous conveyor belt is running on the underside of the appertaining belt conveyor.

7. The device according to claim 6, wherein
while the continuous conveyor belt is running on the underside of the appertaining belt conveyor the rotating body is made to rotate due to friction against a surface that is stationary relative to the movement of the continuous conveyor belt.

8. The device according to claim 6, wherein
the rotating body is a ball.

9. The device according to claim 6, wherein
the rotating body is a roller.

10. The device according to claim 1, wherein
at least one of the outlet sides that is arranged higher in the vertical direction has a ball caster chute, whereby the ball caster chute has a quarter-spherical shape and an uppermost point of a surface of the ball caster chute is at the same height as or at a lower height than the outlet side, and a foot of the ball caster chute extends in the widthwise direction approximately to the same extent as the width of the outlet side, whereby the inlet side of the next transport means is wider than the ball caster chute.

11. The device according to claim 1, wherein
a ninth transport means has a first lengthwise side and a second lengthwise side, whereby the second lengthwise side is arranged essentially parallel to the first lengthwise side, and the lengthwise sides are arranged essentially parallel to the lengthwise sides of the eighth transport means, and whereby the ninth transport means is slanted around its longitudinal axis by an angle of inclination $\beta_2$ in such a way that its first lengthwise side is at a higher level than its second lengthwise side, and whereby the first lengthwise side of the ninth transport means is not at a higher level than the second lengthwise side of the eighth transport means.

12. The device according to claim 1, wherein
the eighth transport means has at least one deflector that is affixed in a direction slanted essentially by 45° relative to the lengthwise direction of the eighth transport means at such a height above the eighth transport means that the movement of the associated transport means is not hindered while packages being transported on the associated transport means are deflected by the deflector out of the transport direction prescribed by the associated transport means.

13. The device according to claim 1, wherein
at least the eighth transport means, a tenth transport means and a twelfth transport means, at their respective outlet sides, have deflectors that are affixed at an angle γ between 10° and 80°, preferably between 15° and 50°, relative to the longitudinal axis of an appertaining conveying means, and said deflectors close off the appertaining conveying means for the packages being transported on them.

* * * * *